United States Patent Office.

C. G. BAYLOR, OF QUINCY, ASSIGNOR TO EDWARD S. TOBEY, RICHARD SOULE, AND CHARLES SOULE, OF BOSTON, AND LOUISA D. BAYLOR, OF QUINCY, MASSACHUSETTS.

Letters Patent No. 100,587, dated March 8, 1870.

IMPROVED COMPOUND TO BE USED AS AN ARTICLE OF DIET.

The Schedule referred to in these Letters Patent and making part of the same.

*To all whom it may concern:*

Be it known that I, CHARLES G. BAYLOR, of Quincy, in the county of Norfolk, and State of Massachusetts, have invented an improved compound to be used as an article of diet; and I do hereby declare that the following is a full, clear, and exact description thereof.

My invention consists in a compound of ground, roasted or dried sweet potatoes and hop; coffee, cocoa or chocolate being used as a flavoring ingredient, if desired; an article being thus produced which may be made into an agreeable, healthful and nutritious beverage, or used as a confection.

To enable others skilled in the art to understand and use my invention, I will proceed to describe the manner in which I have carried it out.

I dry or roast the sweet potatoes and grind it to a powder, whose grains are about the size of ordinary ground coffee. With the sweet potatoes so prepared I mix the raw pulverized hop, or essence thereof, in the proportion of two pods of hop in the natural state, or the essence thereof, to one ounce of the prepared sweet potato, by which I obtain a compound from which a healthy, agreeable and nutritious beverage may be made having the resemblance and flavor of coffee.

The flavor of the above-described compound may be improved by the addition of pure coffee, the quantity added being varied to suit the taste of the buyer or demand of the market.

Cocoa or chocolate may be mixed with the compound instead of coffee, when desired, and a compound thus produced which may be employed as a substitute for chocolate, and this chocolate compound may be used as a confection, or a delicious beverage may be made therefrom.

I prefer to mix about one pound (1 lb.) of coffee, chocolate or cocoa, with four pounds (4 lbs.) of the original compound, but this proportion may be changed to suit the requirements of the case.

The peculiar property of the hop (unfermented) is to impart a sedative and tonic effect, which modifies and counteracts the nervous effects of coffee.

The roasted sweet potato furnishes a body of nutritious substance to the beverages made from the above-described compounds, which are agreeable, healthful, and can be afforded at a very moderate cost.

Claim.

What I claim as my invention, and desire to secure by Letters Patent, is—

1. The within-described compound of hop and ground, roasted, or dried sweet potato, as and for the purpose set forth.

2. A compound of hop, ground, roasted, or dried sweet potato and coffee, cocoa, or chocolate, to be used as a confection, or to be made into a beverage, substantially as set forth.

C. G. BAYLOR.

Witnesses:
P. E. TESCHEMACHER,
W. J. CAMBRIDGE.